United States Patent
Anderson et al.

(10) Patent No.: US 11,566,726 B2
(45) Date of Patent: Jan. 31, 2023

(54) TRIM CARTRIDGE REPAIR KIT AND METHOD

(71) Applicant: FISHER CONTROLS INTERNATIONAL LLC, Marshalltown, IA (US)

(72) Inventors: Aaron Anderson, Marshalltown, IA (US); Daniel M. Adams, Marshalltown, IA (US)

(73) Assignee: FISHER CONTROLS INTERNATIONAL LLC, Marshalltown, IA (US)

(*) Notice: Subject to any disclaimer, the term of this patent is extended or adjusted under 35 U.S.C. 154(b) by 156 days.

(21) Appl. No.: 17/182,762

(22) Filed: Feb. 23, 2021

(65) Prior Publication Data

US 2022/0268371 A1   Aug. 25, 2022

(51) Int. Cl.
| | | |
|---|---|---|
| *F16K 51/00* | (2006.01) | |
| *F16K 27/02* | (2006.01) | |
| *F16K 47/08* | (2006.01) | |
| *F16K 27/04* | (2006.01) | |

(52) U.S. Cl.
CPC ............. *F16K 51/00* (2013.01); *F16K 27/02* (2013.01); *F16K 27/04* (2013.01); *F16K 47/08* (2013.01)

(58) Field of Classification Search
CPC .......... F16K 47/08; F16K 27/02; F16K 27/04; F16K 27/00; F16K 27/12; F16K 51/00; F16K 1/04; F16K 1/36; F16K 2200/502; F16K 1/427

USPC ......................................... 251/357, 360, 361
See application file for complete search history.

(56) References Cited

U.S. PATENT DOCUMENTS

| | | | |
|---|---|---|---|
| 3,506,242 A | * | 4/1970 | Auspach ............... F16K 27/02 251/361 |
| 11,339,891 B2 | * | 5/2022 | Schmitt ................... F16K 47/08 |
| 2018/0216745 A1 | * | 8/2018 | Gabriel ................... F16K 1/465 |
| 2019/0128429 A1 | | 5/2019 | Hostetter et al. |
| 2020/0355289 A1 | * | 11/2020 | Hostetter .............. F16K 27/041 |
| 2021/0018101 A1 | | 1/2021 | Hostetter et al. |

* cited by examiner

*Primary Examiner* — Daphne M Barry
(74) *Attorney, Agent, or Firm* — Marshall, Gerstein & Borun LLP (57) ABSTRACT

A method of servicing a trim cartridge assembly for a valve assembly. The method includes cutting a portion of a bonnet of a trim cartridge assembly and separating the bonnet from a cage of the trim cartridge assembly. The method also includes removing at least one of a retaining ring, a remaining portion of the bonnet, and a spiral wound gasket. The method still further includes replacing the remaining portion of the bonnet with a spacer of a trim cartridge repair kit and disposing a replacement flat sheet gasket of the trim cartridge repair kit at a first end of the spacer. The method also includes disposing a replacement spiral wound gasket of the trim cartridge repair kit at a second end of the spacer opposite the first end of the spacer.

20 Claims, 4 Drawing Sheets

TRIM CARTRIDGE REPAIR KIT AND METHOD

TECHNICAL FIELD

The present disclosure relates to trim cartridge assemblies for control valves and, more specifically, to a trim cartridge repair kit and method of servicing a trim cartridge assembly of a valve assembly.

BACKGROUND

A trim cartridge assembly typically mates a bonnet, a cage element, and a seat element of a valve assembly together for ease of assembly, disassembly, and serviceability. In current trim cartridge assemblies, a snap ring joint or an internal retaining ring is used to assemble the cage to the bonnet. However, both the snap ring joint and the internal retaining ring, and sometimes other components of the trim cartridge assembly, cannot be disassembled without significant damage to the bonnet and the cage, for example. As a result, when parts of the trim cartridge assembly are worn or damaged after extended use and/or in need of service, such parts are typically unable to be serviced and replaced, and the trim cartridge assembly is typically deemed non-serviceable.

SUMMARY

In accordance with a first exemplary aspect, a method of servicing a trim cartridge assembly for a valve assembly comprises cutting a portion of a bonnet of a trim cartridge assembly, separating the bonnet from a cage of the trim cartridge assembly, and removing at least one of a retaining ring, a remaining portion of the bonnet, and a spiral wound gasket. The method further comprises replacing the remaining portion of the bonnet with a spacer of a trim cartridge repair kit and disposing a replacement flat sheet gasket of the trim cartridge repair kit at a first end of the spacer. The method still further comprises disposing a replacement spiral wound gasket of the trim cartridge repair kit at a second end of the spacer opposite the first end of the spacer.

In accordance with a second exemplary aspect of the present disclosure, a trim cartridge repair kit comprises a spacer adapted to replace a remaining portion of a bonnet and a replacement flat sheet gasket adapted to form a seal between the spacer and the bonnet. The replacement flat sheet gasket has a width greater than a width of a removed flat sheet gasket. In addition, the trim cartridge repair kit also includes a spiral wound gasket adapted to form a seal between the spacer and a cage of a trim cartridge assembly. So configured, one or more of the spacer, the replacement flat sheet gasket, and the spiral wound gasket enable a trim cartridge assembly to be serviced.

In accordance with another exemplary aspect of the present disclosure, a method of servicing a trim cartridge assembly for a valve assembly comprises cutting a portion of a bonnet of a trim cartridge assembly, separating the bonnet from a cage of the trim cartridge assembly, and replacing a remaining portion of the bonnet with a spacer. The method also includes disposing a replacement gasket at a first end of the spacer, the replacement gasket forming a seal between the first end of the spacer and the bonnet, and disposing a tensile element at a second end of the spacer opposite the first end of the spacer.

In further accordance with any one of the foregoing exemplary aspects, the methods of servicing a trim cartridge assembly and the trim cartridge repair kit may further include any one or more of the following preferred forms.

In some preferred methods, replacing the remaining portion of the bonnet with a spacer of a trim cartridge repair kit may comprise ensuring a gap exists between the spacer and the cage of the trim cartridge assembly when the trim cartridge assembly is installed in a valve body of the valve assembly.

In other preferred methods, disposing a replacement spiral wound gasket of the trim cartridge repair kit at a second end of the spacer may comprise compressing the replacement spiral wound gasket to a predetermined height, maintaining a predetermined load on the cage through thermal expansion cycles.

In still other preferred methods, disposing a replacement flat sheet gasket of the trim cartridge repair kit at a first end of the spacer may comprise forming a seal between the spacer and the bonnet via the replacement flat sheet gasket.

In other preferred methods, disposing a replacement flat sheet gasket of the trim cartridge repair kit at a first end of the spacer may comprise disposing a replacement flat sheet gasket having a width greater than a width of a removed flat sheet gasket.

In other preferred methods, the method may further comprise disposing a second replacement flat sheet gasket at an end of a cage of the trim cartridge opposite to an end of the cage disposed adjacent to the bonnet.

In still other methods, cutting a portion of a bonnet of a trim cartridge assembly may comprise cutting the portion of the bonnet at one or more of: (1) a bonnet cut line; or (2) a location of the bonnet one or more of near the cage and/or where the bonnet contacts the valve body of the valve assembly.

In still other preferred methods, the method may further comprise disposing the separated bonnet back on the replacement flat sheet gasket.

In other preferred forms, the spacer may have a height adapted to ensure a predetermined gap exists between the spacer and the cage when the trim cartridge assembly is installed in a valve body of a valve assembly.

In other preferred forms, the spiral wound gasket may be both a seal and a spring, such that the spiral wound gasket is adapted to maintain a desired load on the cage of the trim cartridge assembly through at least one thermal expansion cycle.

In still other preferred forms, the spiral wound gasket may be adapted to maintain a load achieved by compression of the spiral wound gasket to a predetermined height.

In other preferred forms, the replacement flat sheet gasket may be a seal and adapted to form a seal between a valve body of the valve assembly and the bonnet.

In still other forms, the width of the replacement flat sheet gasket may be at least one or more of: (1) one and half times; or (2) two times greater than a width of an original flat sheet gasket.

In still other preferred forms, the kit may further comprise a second replacement flat sheet gasket adapted to be disposed near a second end of a cage of the trim cartridge opposite to the first end of the cage disposed adjacent to the bonnet.

In still other methods, the method may further comprise removing at least one part of the trim cartridge assembly after separating the bonnet from the cage of the trim cartridge, and the at least one part of the trim cartridge assembly may include one or more of a flat sheet gasket, a retaining ring, a remaining portion of the bonnet, and a spiral wound gasket.

In still other methods, disposing a replacement gasket at a first end of the spacer may comprise disposing a replacement flat sheet gasket having a width about two times greater than a width of a removed gasket disposed between the bonnet and a valve body of a valve assembly.

In still other methods, disposing a tensile element at a second end of the spacer opposite the first end of the spacer may comprise disposing a replacement spiral wound gasket of a trim cartridge repair kit at the second end of the spacer and compressing the replacement spiral wound gasket to a predetermined height, maintaining a predetermined load on the cage through thermal expansion cycles.

In still other methods, the method may further comprise disposing a second replacement gasket a second end of a cage of the trim cartridge assembly opposite to a first end of the cage, and the second replacement gasket may comprise a flat sheet gasket.

Any one or more of these aspects may be considered separately and/or combined with each other in any functionally appropriate manner. In addition, any one or more of these aspects may further include and/or be implemented in any one or more of the optional exemplary arrangements and/or features described hereinafter. These and other aspects, arrangements, features, and/or technical effects will become apparent upon detailed inspection of the figures and the following description.

BRIEF DESCRIPTION OF THE DRAWINGS

The features of this disclosure which are believed to be novel are set forth with particularity in the appended claims. The present disclosure may be best understood by reference to the following description taken in conjunction with the accompanying drawings, in which like reference numerals identify like elements in the several figures, in which:

DETAILED DESCRIPTION

A trim cartridge repair kit and a method of servicing a trim cartridge assembly of a valve assembly are disclosed. Generally, the method allows the trim cartridge assembly to be serviced and operable without a snap ring or a retaining ring installed. As a result, serviceability to components of the trim cartridge previously sold as a non-serviceable unit is now enabled. More specifically, the method of servicing the trim cartridge assembly includes cutting a portion of a bonnet of a trim cartridge and then separating the bonnet from a cage of the trim cartridge. The method also includes removing at least one of the snap ring or retaining ring, the remaining portion of the bonnet, and a spiral wound gasket. The method further includes replacing the remaining portion of the bonnet with a spacer of the trim cartridge repair kit, disposing a replacement flat sheet gasket of the trim cartridge repair kit at a first end of the spacer, and disposing a replacement spiral wound gasket of the trim cartridge repair kit at a second end of the spacer opposite the first end of the spacer.

Figure 1:
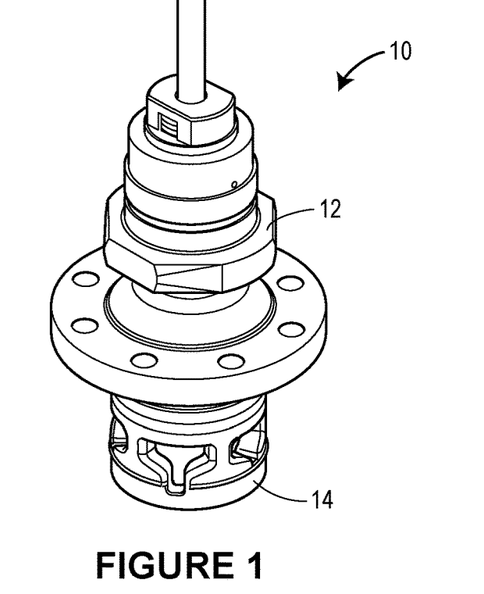
FIG. 1 is a perspective view of a conventional trim cartridge assembly.

Referring now to FIG. 1, a perspective view of a conventional trim cartridge assembly 10 is depicted. The trim cartridge assembly 10 includes a bonnet 12 and a cage 14 coupled to the bonnet 12. The trim cartridge assembly 10 is adapted to be installed within a valve body of a valve assembly, as explained more below and depicted in FIG. 2. In some examples, the trim cartridge assembly 10 may include, but is not limited to, Fisher Controls e-body line of trim. The e-body line of trim includes ET, ED, and ES cage guided trim and post guided EZ style trim.

Figure 2:
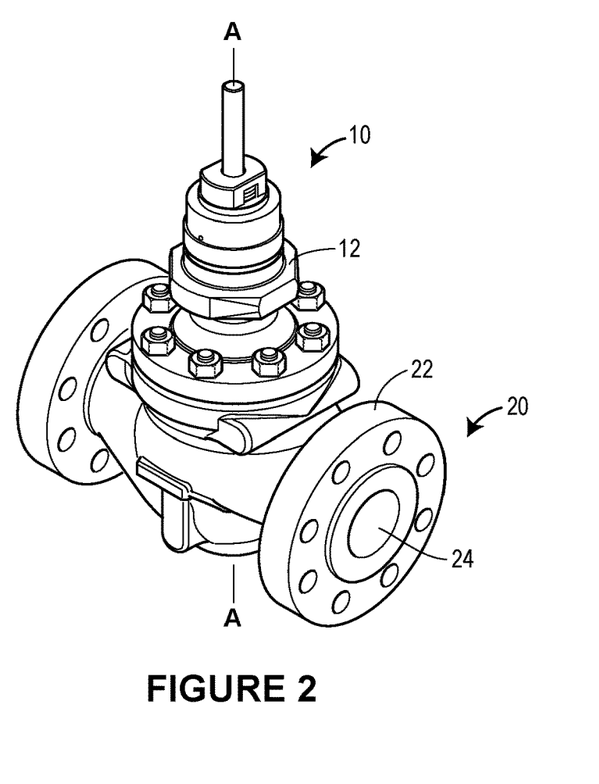
FIG. 2 is a perspective view of a valve assembly with the trim cartridge assembly of FIG. 1 coupled thereto.

Referring now to FIG. 2, the trim cartridge 10 of FIG. 1 is depicted installed within a valve assembly 20. Specifically, the valve assembly 20 includes a valve body 22 having an inlet 24 (FIG. 3A) and an outlet 26 defining a passageway through the valve body 22. The trim cartridge assembly 10 is disposed in the valve body 22, as described more below.

Figure 3A:
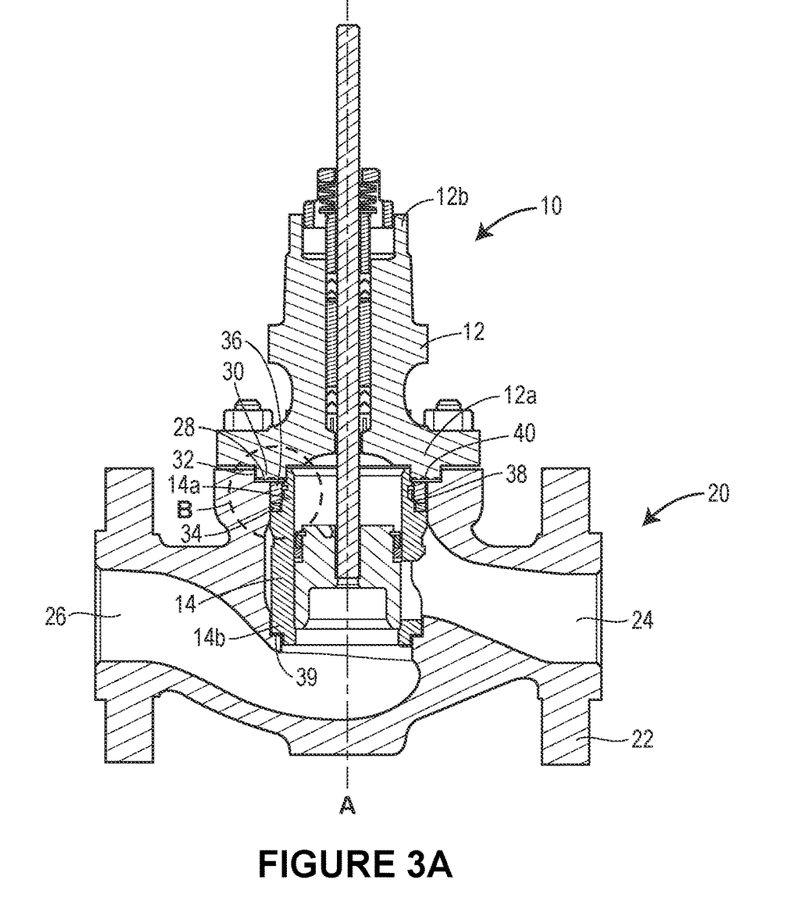
FIG. 3A is a cross-sectional view of the valve assembly of FIG. 2 taken along the line A-A of FIG. 2.

Referring now to FIG. 3A a cross-sectional view of the valve assembly 20 having the trim cartridge assembly 10 disposed therein (of FIG. 2) is depicted. Specifically, the trim cartridge assembly 10 is disposed within the body 22 of the valve assembly 20. In addition, upon installation of the trim cartridge assembly 10 in the valve assembly 20, a flat sheet gasket 28 is disposed between a portion 30 of the bonnet 12 and a portion 32 of the valve body 22 in contact with the bonnet 12. In addition, a spiral wound gasket 34 is disposed below the portion 30 of the bonnet 12 and adjacent to the portion 32 of the valve body 22, such that the spiral wound gasket 34 is between and in contact with a portion of a first end 14a of the cage 14, the valve body 22, and an extending portion 36 of the bonnet 12. Further, and as also depicted in FIG. 3A, a retaining ring 38 is disposed between and in contact with the cage 14 and the extending portion 36 of the bonnet 12. In this example, the bonnet 12 and cage 14 of the trim cartridge assembly 10 cannot normally be disassembled due to the internal retaining ring 38, for example, which locks the bonnet 12 and the cage 14 together. Still further, a second flat sheet gasket 39 is disposed and in contact with a portion of a second end 14b of the cage 14 and another portion of the valve body 22.

In accordance with a first aspect of the present disclosure, a method of servicing the trim cartridge assembly 10 of FIGS. 1-3A installed in the valve assembly 20 is disclosed. The method enables the previously non-serviceable trim cartridge assembly 10 of the valve assembly 20 to be serviced and repaired, saving significant cost in replacement the trim cartridge assembly 10, for example. The method includes first cutting a portion of the bonnet 12 of the trim cartridge assembly 10, such as cutting the bonnet 12 of the trim cartridge assembly 10 along the a bonnet cut line 40, which is depicted in FIGS. 3A and 3B. In one example, cutting the portion of the bonnet 12 of the trim cartridge assembly 10 comprises cutting the portion of the bonnet 12 at a location of the bonnet 12 one or more of near the first end 14a of the cage 14 and/or near where the bonnet 12 contacts the valve body 22 of the valve assembly 20. It will be understood that any cutting element or cutting mechanism capable of serrating and cutting the bonnet 12 and its material may be used and fall within the scope of the present disclosure. In one example, the cut surface on the bonnet 12 must be serrated to prepare the cut surface for a sealing surface upon re-use.

Figure 3B:
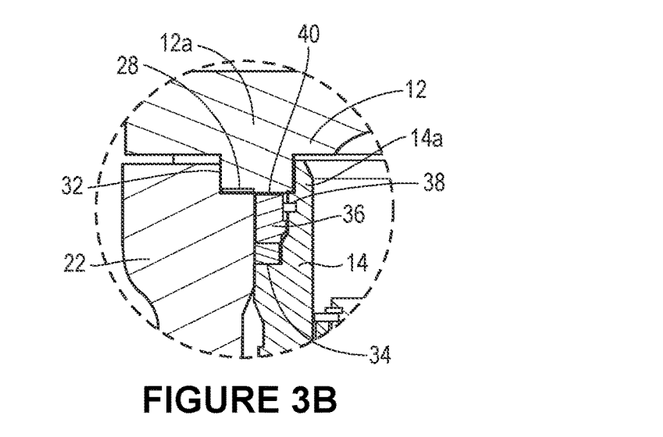
FIG. 3B is a close-up view of a portion B of FIG. 3A.

As depicted in FIG. 3B, a close-up view of the bonnet cut line 40 is depicted. As shown therein, the bonnet cut line 40 is disposed on a first end 12a of the bonnet 12, such as a lower end, near the first end 14a of the cage 14 and where the bonnet 12 contacts the valve body 22 of the valve assembly 20. More specifically, the bonnet cut line 40 or the portion of the bonnet 12 that is cut is disposed at the lower end 12a of the bonnet 12 between a first portion 32 of the valve body 22 and the first end 14a of the cage 14. By cutting the bonnet 12 on this position of the bonnet 12, e.g., at the bonnet cut line 40, access to all internal components, such as a retaining ring, of the trim cartridge assembly 10 is provided and service and repairs conducted, as explained more below.

The method further includes separating the bonnet 12 from the cage 14 of the trim cartridge 10 after cutting the portion of the bonnet 12. After the bonnet 12 is separated from the cage 12, the original extending portion 36 is now the remaining portion 36 of the bonnet 12. The remaining portion 36 is disposed between the valve body 22 and the first end 14a of the cage 14, as depicted in FIGS. 3A and 3B. The method thus further includes removing at least the retaining ring 38, the remaining portion 36 of the bonnet 12, and the spiral wound gasket 34. This then allows a user to ultimately replace the removed parts with new parts of a trim cartridge repair kit of the present disclosure, as explained more below.

Figure 4:
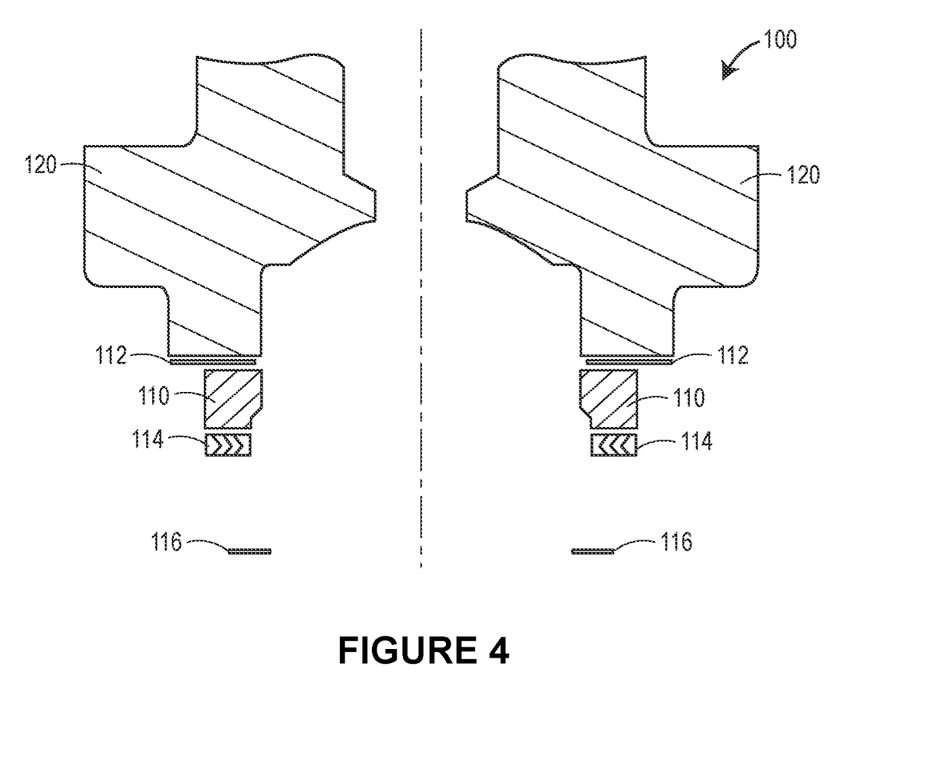
FIG. 4 is a cross-sectional view of a trim cartridge repair kit according to an aspect of the present disclosure.

Specifically, and referring now to FIG. 4, a trim cartridge repair kit 100 according to one aspect of the present disclosure is depicted. The trim cartridge repair kit 100 includes a spacer 110 adapted to replace the remaining portion 36 of the bonnet 12 depicted in FIGS. 3A and 3B. The kit 100 also includes a first replacement gasket 112, such as a replacement flat sheet gasket 112, adapted to form a seal between the spacer 110 and a modified bonnet 120 (as explained more below). The spacer 110 has a height adapted to ensure a predetermined gap exists between the spacer 110 and the cage 14 when the trim cartridge assembly 10 is installed in the valve body 22 of the valve assembly 20. In addition, the first replacement gasket 112, such as the replacement flat sheet gasket 112, has a width greater than a width of the removed flat sheet gasket 28 of FIGS. 3A and 3B, for example. In fact, in one example, the width of the first replacement gasket 112 of the trim cartridge repair kit 100 is at least one or more of one and half times or two times greater than the width of the removed flat sheet gasket 28. In another example, the first replacement gasket 112, such as the first replacement flat sheet gasket 112, is a seal and thus forms a seal between the valve body 22 of the valve assembly 20, the bonnet 120, and the cage 14 (see, e.g., FIG. 5). Further, the first replacement gasket 112 may comprise one or more of graphite, stainless steel, and/or other similar materials and still fall within the scope of the present disclosure. For example, in one example, the first replacement gasket 112 may include several combinations of materials, such as one or more of: (1) graphite and stainless steel; (2) monel and PTFE; (3) graphite; and (4) hastelloy and PTFE. In addition, the spacer 110 may also comprise steel and ideally matches the material of the modified bonnet 120.

Still referring to FIG. 4, the trim cartridge repair kit 100 also includes a tensile element 114, such as a spiral wound gasket, that is adapted to form a seal between the spacer 110 and the cage 14 of the trim cartridge assembly 10, as explained more below. In one example, the tensile element 114, such as the spiral wound gasket, is a seal and a spring element, such that the tensile element 114 is adapted to maintain a desired load on the cage 14 of the trim cartridge assembly 10 throughout thermal expansion cycles. For example, if the load delivered by the spiral wound gasket 114 is too small, a second replacement flat sheet gasket 116 (described more below) will leak, and the valve assembly 20 will not seal properly. In addition, if the load delivered by the spiral wound gasket 114 is too large, the metal of the cage 14 can buckle, potentially trapping a valve plug of the valve assembly 20 and preventing it from opening or closing.

In another example, the tensile element 114, such as the spiral wound gasket, includes a predetermined height, such that the tensile element 114 is compressed to this predetermined height to maintain the predetermined load on the cage 14. The tensile element 114 provides a range of compression and expansion and is thus adaptable to variety of sizes of components of trim cartridge assemblies 10 and associated valve assemblies 20.

As further depicted in FIG. 4, the trim cartridge repair kit 100 also includes a second gasket 116, such as a second replacement flat sheet gasket. The second gasket 116 is adapted to be disposed near the second end 14b of the cage 14 of the trim cartridge assembly 10 opposite the first end 14a of the cage 14 disposed adjacent to the bonnet 12. As will be understood, one or more of the spacer 110, the first gasket 112, such as the first replacement flat sheet gasket 112, the tensile element 114, such as the spiral wound gasket 114, and the second gasket 116, such as the second replacement flat sheet gasket 116, enable the typically non-serviceable trim cartridge assembly 10 to be serviced and repaired when needed.

Figure 5:
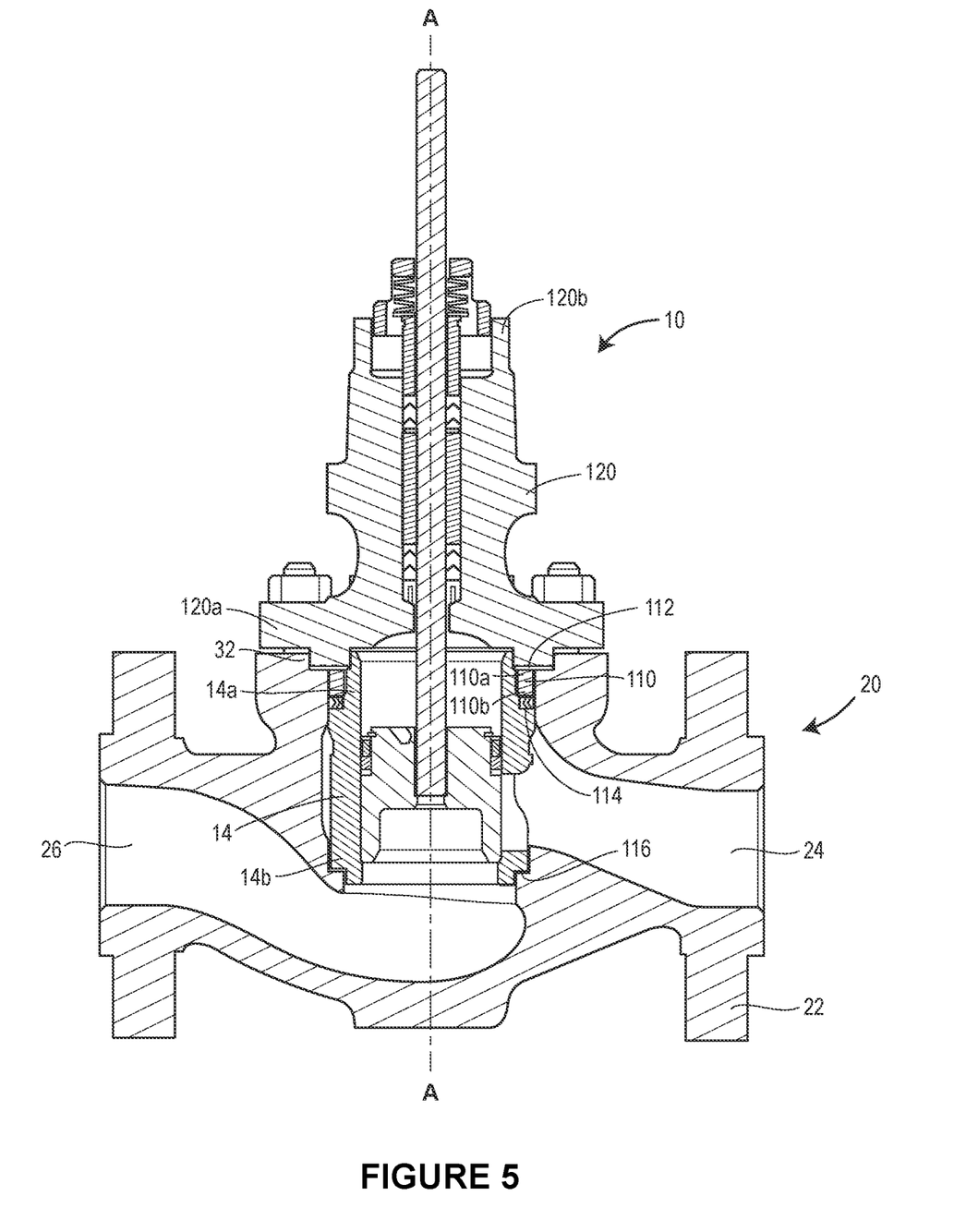
FIG. 5 is a cross-sectional view of the valve assembly of FIG. 2, with the trim cartridge repair kit installed therein.

Referring now to FIG. 5, a cross-sectional view of the valve assembly 20 of FIG. 2, with the trim cartridge repair kit 100 installed therein is depicted. After the at least one the retaining ring 38, the remaining portion 36 of the original bonnet 12, and the spiral wound gasket 34 are removed, as described above relative to FIGS. 3A and 3B, for example, the method of servicing the trim cartridge 10 further includes installing the trim cartridge repair kit 100 in the valve assembly 20. More specifically, the method of servicing the trim cartridge 10 further includes replacing the remaining portion 36 of the original bonnet 12 with the spacer 110 of the trim cartridge repair kit 100. In addition, the method also includes disposing the replacement flat sheet gasket 112 of the trim cartridge repair kit 100 at a first end 110a of the spacer 110 and disposing the tensile element 114, such as the replacement spiral wound gasket 114, at a second end 110b of the spacer 110 opposite the first end 110a of the spacer 100, as depicted in FIG. 5.

In one example, replacing the remaining portion 36 of the bonnet 12 with the spacer 110 of the trim cartridge repair kit 100 may comprises ensuring a gap exists between the spacer 110 and the cage 14 of the trim cartridge assembly 10 when the trim cartridge assembly 10 is installed in the valve body 22 of the valve assembly 20. In addition, and in another example, disposing the replacement spiral wound gasket 114 at the second end 110b of the spacer 110 may comprise compressing the replacement spiral wound gasket 114 to a predetermined height to maintain a predetermined load on the cage 14 through thermal expansion cycles. In still other examples, disposing the replacement flat sheet gasket 112 at the first end 110a of the spacer 110 may comprise forming a seal between the spacer 110 and the modified bonnet 120 via the replacement flat sheet gasket 112. In yet another example, disposing the replacement flat sheet gasket 112 of the trim cartridge repair kit 100 at the first end of the spacer 110 comprises disposing the replacement flat sheet gasket having a width greater than a width of the removed flat sheet gasket 28 (see, e.g., FIG. 3A).

In addition, the method of servicing the trim cartridge assembly 10 may further include disposing the second replacement flat sheet gasket 116 at the second end 14b of the cage 14 of the trim cartridge assembly 10 opposite to the first end 14a of the cage 14 disposed adjacent to the modified bonnet 120. Further, in another example, the method may also then include disposing a portion of the separated, modified bonnet 120 on the replacement flat sheet gasket 112, as depicted again in FIG. 5.

In another example, a method of servicing the trim cartridge assembly 10 for a valve assembly 20 includes cutting the portion of the bonnet 12 of the trim cartridge assembly 10, separating the bonnet 12 from the cage 14 of the trim cartridge assembly 10, and replacing the remaining portion 36 of the bonnet 12 with the spacer 110 of the trim cartridge repair kit 100. The method also includes disposing the replacement gasket 112 at the first end 110a of the spacer 110, such that the replacement gasket 112 forms a seal between the first end 110a of the spacer 110 and the modified bonnet 120, and disposing the tensile element 114, such as the replacement spiral wound gasket 114, at the second end 110b of the spacer 110 opposite the first end 110a of the spacer 110.

In this example, after separating the bonnet 12 from the cage 14 of the trim cartridge assembly 10, the method further includes removing at least one part of the trim cartridge assembly 10. In one example, the at least one part of the trim cartridge assembly 10 includes one or more of the retaining ring 38, the remaining portion 36 of the bonnet 14, and the spiral wound gasket 34 (see, e.g., FIG. 3A).

In addition, in some examples, disposing the tensile element 114 at the second end 110b of the spacer 110 opposite the first end 110a of the spacer 110 comprises disposing the replacement spiral wound gasket 114 of the trim cartridge repair kit 100 at the second end 110b of the spacer 110 and compressing the replacement spiral wound gasket 34 to a predetermined height, maintaining a predetermined load on the cage 14 throughout the thermal expansion cycles. In another example, the method may further comprise disposing the second replacement gasket 116 at the second end 14b of the cage 14 of the trim cartridge assembly 10, the second end 14b opposite to the first end of the cage 14. In one example, the second replacement gasket 116 is a flat sheet gasket.

At least in view of the foregoing, it will be appreciated that the trim cartridge repair kit 100 and associated methods of servicing the trim cartridge assembly 10 include several advantages. For example, the kit 100 and methods introduce a way to service the trim cartridge assembly 10 without damaging the cage 14 and the bonnet 12 beyond re-use. As a result, the trim cartridge assembly 10 is now able to be re-assembled on known valve assemblies 20 utilizing the trim cartridge assembly 10. In addition, the snap ring or retaining ring is able to be discarded, as the trim cartridge assembly 10 is now able to be reassembled by way of the new trim cartridge repair kit 100 without a need for the snap ring or retaining ring to be reinstalled. Thus, the new trim cartridge repair kit 100 and associated methods of servicing the trim cartridge assembly 10 provide serviceability to components of the trim cartridge assembly 10 previously sold and/or deemed a non-serviceable unit, increasing the life and marketability of the trim cartridge assembly 10 and reducing expense of new units.

The figures and description provided herein depict and describe preferred embodiments of a trim cartridge repair kit and a method of servicing a trim cartridge assembly for purposes of illustration only. One skilled in the art will readily recognize from the foregoing discussion that alternative embodiments of the components illustrated herein may be employed without departing from the principles described herein. Thus, upon reading this disclosure, those of skill in the art will appreciate still additional alternative structural and functional designs. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the methods and components disclosed herein without departing from the spirit and scope defined in the appended claims.

What is claimed:

1. A method of servicing a trim cartridge assembly for a valve assembly, the method comprising:
   cutting a portion of a bonnet of a trim cartridge assembly;
   separating the bonnet from a cage of the trim cartridge assembly;
   removing at least one of a retaining ring, a remaining portion of the bonnet, and a spiral wound gasket;
   replacing the remaining portion of the bonnet with a spacer of a trim cartridge repair kit;
   disposing a replacement flat sheet gasket of the trim cartridge repair kit at a first end of the spacer; and
   disposing a replacement spiral wound gasket of the trim cartridge repair kit at a second end of the spacer opposite the first end of the spacer.

2. The method of claim 1, wherein replacing the remaining portion of the bonnet with a spacer of a trim cartridge repair kit comprises ensuring a gap exists between the spacer and the cage of the trim cartridge assembly when the trim cartridge assembly is installed in a valve body of the valve assembly.

3. The method of claim 1, wherein disposing a replacement spiral wound gasket of the trim cartridge repair kit at a second end of the spacer comprises compressing the replacement spiral wound gasket to a predetermined height, maintaining a predetermined load on the cage through thermal expansion cycles.

4. The method of claim 1, wherein disposing a replacement flat sheet gasket of the trim cartridge repair kit at a first end of the spacer comprises forming a seal between the spacer and the bonnet via the replacement flat sheet gasket.

5. The method of claim 1, wherein disposing a replacement flat sheet gasket of the trim cartridge repair kit at a first end of the spacer comprises disposing a replacement flat sheet gasket having a width greater than a width of a removed flat sheet gasket.

6. The method of claim 1, further comprising disposing a second replacement flat sheet gasket at an end of a cage of the trim cartridge opposite to an end of the cage disposed adjacent to the bonnet.

7. The method of claim 1, wherein cutting a portion of a bonnet of a trim cartridge assembly comprises cutting the portion of the bonnet at one or more of: (1) a bonnet cut line; or (2) a location of the bonnet one or more of near the cage and/or where the bonnet contacts the valve body of the valve assembly.

8. The method of claim 1, further comprising disposing the separated bonnet back on the replacement flat sheet gasket.

9. A trim cartridge repair kit comprising:
   a spacer adapted to replace a remaining portion of a bonnet;
   a replacement flat sheet gasket adapted to form a seal between the spacer and the bonnet, the replacement flat sheet gasket having a width greater than a width of a removed flat sheet gasket; and a spiral wound gasket adapted to form a seal between the spacer and a cage of a trim cartridge assembly, wherein one or more of the spacer, the replacement flat sheet gasket, and the spiral wound gasket enable a trim cartridge assembly to be serviced.

10. The trim cartridge repair kit of claim 9, wherein the spacer has a height adapted to ensure a predetermined gap exists between the spacer and the cage when the trim cartridge assembly is installed in a valve body of a valve assembly.

11. The trim cartridge repair kit of claim 9, wherein the spiral wound gasket is a seal and a spring, such that the spiral wound gasket is adapted to maintain a desired load on the cage of the trim cartridge assembly through at least one thermal expansion cycle.

12. The trim cartridge repair kit of claim 9, where in the spiral wound gasket is adapted to maintain a load achieved by compression of the spiral wound gasket to a predetermined height.

13. The trim cartridge repair kit of claim 9, wherein the replacement flat sheet gasket is a seal and adapted to form a seal between a valve body of the valve assembly and the bonnet.

14. The trim cartridge repair kit of claim 9, where the width of the replacement flat sheet gasket is at least one or more of: (1) one and half times; or (2) two times greater than a width of an original flat sheet gasket.

15. The trim cartridge repair kit of claim 9, further comprising a second replacement flat sheet gasket adapted to be disposed near a second end of a cage of the trim cartridge opposite to the first end of the cage disposed adjacent to the bonnet.

16. A method of servicing a trim cartridge assembly for a valve assembly, the method comprising:

cutting a portion of a bonnet of a trim cartridge assembly;

separating the bonnet from a cage of the trim cartridge assembly;

replacing a remaining portion of the bonnet with a spacer;

disposing a replacement gasket at a first end of the spacer, the replacement gasket forming a seal between the first end of the spacer and the bonnet; and disposing a tensile element at a second end of the spacer opposite the first end of the spacer.

17. The method of claim 16, further comprising removing at least one part of the trim cartridge assembly after separating the bonnet from the cage of the trim cartridge, the at least one part of the trim cartridge assembly including one or more of a flat sheet gasket, a retaining ring, a remaining portion of the bonnet, and a spiral wound gasket.

18. The method of claim 16, wherein disposing a replacement gasket at a first end of the spacer comprises disposing a replacement flat sheet gasket having a width about two times greater than a width of a removed gasket disposed between the bonnet and a valve body of a valve assembly.

19. The method of claim 16, wherein disposing a tensile element at a second end of the spacer opposite the first end of the spacer comprises disposing a replacement spiral wound gasket of a trim cartridge repair kit at the second end of the spacer and compressing the replacement spiral wound gasket to a predetermined height, maintaining a predetermined load on the cage through thermal expansion cycles.

20. The method of claim 16, further comprising disposing a second replacement gasket a second end of a cage of the trim cartridge assembly opposite to a first end of the cage, the second replacement gasket comprising a flat sheet gasket.

* * * * *

UNITED STATES PATENT AND TRADEMARK OFFICE
CERTIFICATE OF CORRECTION

Page 1 of 1

PATENT NO. : 11,566,726 B2
APPLICATION NO. : 17/182762
DATED : January 31, 2023
INVENTOR(S) : Aaron Anderson et al.

It is certified that error appears in the above-identified patent and that said Letters Patent is hereby corrected as shown below:

In the Specification

At Column 3, Line 38, "FIG. 1" should be -- FIG. 1 --.

At Column 4, Line 52, "the a" should be -- a --.

In the Claims

At Column 9, Line 19, "where in" should be -- wherein --.

Signed and Sealed this
Tenth Day of December, 2024

Katherine Kelly Vidal
*Director of the United States Patent and Trademark Office*